2,811,564
Patented Oct. 29, 1957

2,811,564
PREPARATION OF TERPENE DIPHENOLIC COMPOUNDS

Alfred R. Bader, Milwaukee, Wis., assignor to Pittsburgh Plate Glass Company, Allegheny County, Pa., a corporation of Pennsylvania No Drawing. Application October 21, 1954,
Serial No. 463,814

3 Claims. (Cl. 260—619)

This invention relates to an improved method for preparing terpenephenolic compounds, and pertains more particularly to the reaction of a phenolic compound with a cyclic terpene in the presence of polyphosphoric acid.

It is well known that phenols may be reacted with cyclic terpenes in the presence of a condensation catalyst to give a resinous product useful in coating compositions such as paints, varnishes, lacquers and the like. Many of the early processes produced resinous materials which were insoluble in alcohols, and which also possessed the disadvantage of being non reactive with drying oils. Consequently, these resinous materials were of somewhat limited utility.

More recently, however, it was found that alcohol soluble terpenephenol resins could be obtained by utilizing certain critical expedients in carrying out the reaction. For example, it is disclosed in U. S. Patent 2,596,235 that (1) an excess of phenol must be utilized, and (2) the terpene must be added to a previously prepared mixture, suspension, dispersion or solution of the condensation catalyst in phenol heated to a relatively high temperature, which is indicated as being from about 50° C. to about 90° C. Catalysts disclosed as being useful are the activated clays and certain Friedel-Crafts compounds such as the boron trifluoride etherates or alcoholates.

This latter method, however, also possesses certain disadvantages in that it produces only low yields of the terpene-phenol reaction product, (on the order of 15 percent to 45 percent), requires addition of reactants in a certain manner, and requires heating to effect the desired reaction.

It has now been discovered that nearly quantitative yields of pure diphenolic compounds can be readily obtained by utilizing polyphosphoric acid as the reaction catalyst. By employing polyphosphoric as the catalyst, the reaction goes readily even at room temperature, and the manner of addition of the reactants is not critical.

The reaction of cyclic terpenes with phenols in accordance with the present invention is illustrated by the following equation, wherein dipentene and phenol are utilized for illustrative purposes:

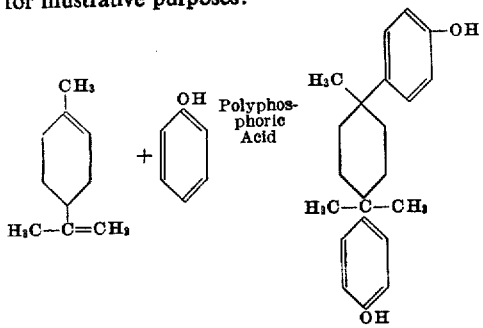

For reasons of economy and ease of reaction, phenol is the preferred phenolic compound for reaction with cyclic terpenes to form terpene diphenols of the type depicted in the above equation. However, other phenolic compounds, including the cresols, butylphenol, amylphenol, naphthols, and the like may also be utilized with good results.

Cyclic terpenes which may be used in the reaction of this invention include dipentene, turpentine, alpha-pinene, beta-pinene or mixtures of these compounds. All of these terpenes are readily available commercial materials.

Inasmuch as some of the cyclic terpenes described above possess two double bonds at which reaction with the phenolic compound can take place, it is ordinarily desirable that an excess of the phenolic compound be employed in order that substantial yields of the desired product will be obtained. Preferably the ratio of phenol to terpene is about 1.5:1 to 2.5:1. However, the use of an excess of the cyclic terpene is not a critical expedient, and in fact, excellent yields of diphenols are obtained from the reaction of dipentene and phenol when the dipentene is actually present in a slight excess.

Polyphosphoric acid may be regarded as comprising a reaction product of or a solution of orthophosphoric acid ($H_3PO_4$) and phosphorus pentoxide ($P_2O_5$). This acid is termed "a condensed phosphoric acid" and its formula is understood to be the following:

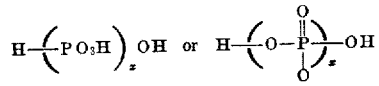

wherein $x$ is greater than 1. Polyphosphoric acid is an easily handled and relatively inexpensive viscous liquid which contains about 82 percent to 85 percent of phosphorus pentoxide.

The quantity of polyphosphoric acid utilized may be varied widely. In general, however, it is desirable to utilize about two-thirds part by weight of catalyst for each part of the phenol. However, smaller amounts of the catalyst, for example, about one-half part by weight for each part of phenol may be used, as may larger amounts, for example, as much as one part or more of polyphosphoric acid per part of phenol. The catalyst is recovered substantially unchanged and can be used over in combination with additional quantities of fresh catalyst.

It has been found that the addition of a small amount of phosphoric acid (about 10 percent by weight) to the polyphosphoric acid aids in controlling the reaction temperature within the desired range.

As indicated hereinabove, it is an advantage of the improved process of the present invention that the reaction can be carried out at room temperature to give nearly quantitative yields of the desired phenolic product. It has been found that the reaction is slightly exothermic and the reaction temperature may rise as high as 30° C. or 35° C. during the course of the reaction. Temperatures higher than 30° C. or 35° C. are not desirably utilized as they tend to produce a mixture of products, making recovery of the desired product more difficult, and also lowering the yield thereof.

However, if desired, the reaction can be carried out at temperatures substantially below room temperature, for example, as low as 10° C. or even lower with good results. It has been found that at temperatures of below about 35° C. the diphenols are almost exclusively para substituted; at higher temperatures there is more ortho substitution. Since the para, para isomer is the preferred product, the advantages of being able to operate at substantially room temperature in accordance with this invention are obvious.

The reaction is preferably conducted in an inert solvent or diluent, for example, the aliphatic hydrocarbons such as hexane or heptane, or aromatic hydrocarbons such as toluene or the petroleum naphthas.

The reaction is carried out by admixing the phenol, cyclic terpene and catalyst in the inert solvent or diluent with good agitation. Since the reaction tends to be slightly exothermic, it is sometimes advantageous to add either the phenol or the terpene to a mixture of the other and catalyst in the solvent or diluent in order to assist in temperature control. However, as indicated hereinabove, it is an advantage of this invention that the manner of addition of reactants is not a critical expedient. As the reaction proceeds the reaction mixture becomes quite viscous (after about 6 to 8 hours) and ordinarily the reaction is substantially complete in about 12 hours. Because the reaction mixture does become very viscous, it is highly important that it be well agitated continuously to insure proper contact of reactants and catalyst.

One preferred method of recovering the terpene diphenols from the reaction mixture involves first adding a material such as isopropyl ether thereto to give an ether layer containing the desired reaction product, and a heavy, viscous catalyst layer from which the ether layer is decanted. The ether solution is then extracted with an aqueous solution of an alkali such as sodium hydroxide or potassium hydroxide and the resulting alkaline solution extracted with toluene which extracts the minor amounts of monoether-monophenols present. The diphenoxide solution is then acidified, preferably with a mineral acid, extracted with ethyl acetate, stripped and distilled. By carrying out the reaction in this manner substantially all of the phenol is reacted and only a small residue is obtained. The diphenol is obtained as a light colored, glass like material. Actually the diphenol is obtained as a mixture of two isomers. These isomers are readily separated by virtue of the fact that one forms a crystalline toluate containing half a mole of toluene of crystallization per mole of the diphenol whereas the second is toluene free. Thus, if it is desirable to separate the isomers, the procedure described above is followed through the acidification step, after which the product is extracted with toluene. The toluate forms at once as copious white crystals at the interface, and these are readily recovered by filtering.

The following examples illustrate the preparation of diphenols in accordance with the improved method of this invention. The examples are not intended to limit the invention, however, for there are, of course, numerous possible variations and modifications.

Example I

Twelve hundred twenty grams of phenol, 1000 cc. of heptane, 800 grams of polyphosphoric acid and 80 grams of 85 percent phosphoric acid were admixed in a glass reactor. The mixture was agitated constantly while 1360 grams of dipentene were added over a four hour period, the temperature being maintained at 30° C. to 35° C. After continuous agitation for 8 hours the reaction mixture had become very viscous. Isopropyl ether was then added whereupon the catalyst settled and the organic layer was decanted. The catalyst layer was washed several times with isopropyl ether and the combined ether solutions were washed successively with water, aqueous sodium bicarbonate and water and stripped to 200° C. at 1 mm. to yield a faintly yellow, glass like product having a hydroxyl number of 330. The yield of the diphenol was 2000 grams.

Example II

To a mixture of 188 grams of phenol, 250 cc. of solvent naphtha and 100 grams of polyphosphoric acid, 136 grams of alpha-pinene was slowly added over a period of 4 hours, the reaction temperature being maintained below 35° C. and the reaction mixture being agitated through- out the addition of the alpha-pinene and for an additional 6½ hours. The reaction mixture was then treated as in Example I to give an almost quantitative yield of para, para diphenols.

Example III

One hundred thirty-six grams of turpentine was added over a 45 minute period to a stirred mixture of 94 grams of phenol, 200 cc. of heptane, 75 grams of polyphosphoric acid and 25 grams of phosphoric acid, the temperature being maintained at 30° C. Agitation was continued for an additional 18 hours, after which the reaction mixture was worked up in accordance with the procedure of Example I. A substantial yield of para, para diphenols of the structure

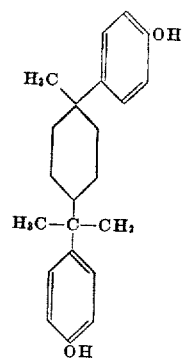

was obtained.

When the above examples are repeated substituting other of the phenols disclosed hereinabove for phenol, diphenols are again obtained in substantially quantitative yields; thus, for example, when dipentene is reacted with p-tertiary butylphenol in the presence of polyphosphoric acid, a diphenol having the following structure is obtained:

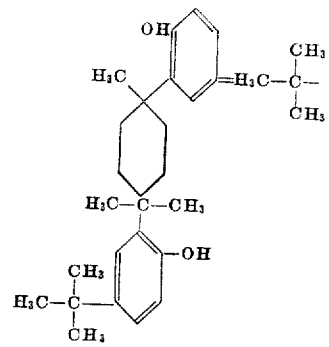

Similarly when the ratio of phenolic compound to cyclic terpene is varied from the ratios utilized in the specific examples, or when larger or smaller amounts of polyphosphoric acid are employed, the reaction proceeds readily at room temperature to give much better yields of diphenols than when other catalysts are used.

The diphenolic compounds obtained by the improved process of this invention are very useful materials. For example, they can be condensed with aldehydes such as formaldehyde to give resinous products useful as components of coating compositions. The preparation of such resinous condensates is illustrated by the following example:

To 113 grams (1 mole) of a diphenol (obtained according to the method of Example I) were added the following:

86 grams (35.2 percent) formalin solution
20 grams sodium hydroxide
100 grams water The resulting mixture was stirred for 140 hours at room temperature and then acidified with 27 cc. of sulfuric acid to give a pH of 5.3. The acidified reaction product was washed with water, butanol added, and the water distilled off azeotropically to give 225 grams of resinous product having a solids content of 64.8, and a Gardner viscosity of I–J. The resin was spread out as a film and baked at 370° F. for 10 minutes to give a film having a Sward hardness of 56.

The diphenolic compounds obtained by reacting cyclic terpenes with phenols can also be reacted with epichlorohydrin to give useful epoxy resins. This reaction is illustrated by the following example:

A solution of 452 grams of a terpene diphenol (prepared according to the method of Example I) in 200 cc. of xylene was heated to a temperature of 50° C. To this solution 925 grams of epichlorohydrin was added, the temperature rising to 90° C. due to the exothermic reaction. After about an hour 500 grams of water and 200 grams of ethanol were added, the latter to aid in phase separation. The water and alcohol are decanted and the remaining product stripped to give an epoxy resin having a solids content of 60.2 percent, a Gardner viscosity of B, and a Gardner color of 9. The epoxide equivalent at 60.2 percent solids was 1225. The solvent was then removed to give 990 grams of resin which at 95.7 percent solids had an epoxide equivalent of 1420. The resin cured in the presence of triethylene tetraamine to give a hard, dark material. The epoxide resins thus prepared can be used as coil potting resins.

From the foregoing description of the invention it is apparent that the use of a polyphosphoric catalyst in the reaction of a cyclic terpene with a phenol constitutes an improved method for obtaining valuable products. It is also apparent, therefore, that numerous possible variations and modifications can be made in the process described without departing from the spirit and scope of the invention as defined in the appended claims.

I claim:

1. In the method of preparing a terpene diphenolic compound by the reaction of a cyclic terpene with a phenolic compound in the presence of a condensation catalyst, the improvement which comprises carrying out the reaction at a temperature below about 35° C. and in the presence of polyphosphoric acid.

2. In the method of preparing a terpene diphenol by the reaction of a cyclic terpene with phenol in the presence of a condensation catalyst, the improvement which comprises carrying out the reaction at a temperature below about 35° C. and in the presence of polyphosphoric acid.

3. The method of claim 2 wherein the reaction is carried out at a temperature in the range of 10° C. to 35° C.

References Cited in the file of this patent

UNITED STATES PATENTS

| | | |
|---|---|---|
| 1,469,709 | Wuyts | Oct. 2, 1923 |
| 2,129,153 | Schirm | Sept. 6, 1938 |
| 2,147,256 | Ipatieff et al. | Feb. 14, 1939 |
| 2,596,235 | Geiger | May 13, 1952 |

OTHER REFERENCES

Martin: Paint Manufacture, vol. 15, pgs. 30–32 (February 1945).

UNITED STATES PATENT OFFICE
Certificate of Correction

Patent No. 2,811,564 October 29, 1957

Alfred R. Bader

It is hereby certified that error appears in the printed specification of the above numbered patent requiring correction and that the said Letters Patent should read as corrected below.

Column 4, lines 40 to 44, the upper portion of the formula should appear as shown below instead of as in the patent:

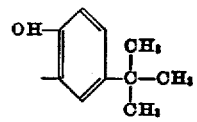

Signed and sealed this 27th day of May 1958.

[SEAL]

Attest:
KARL H. AXLINE,
*Attesting Officer.*

ROBERT C. WATSON,
*Commissioner of Patents.*